(No Model.)
W. A. SHAW.
SECONDARY BATTERY.
No. 297,457.          Patented Apr. 22, 1884.
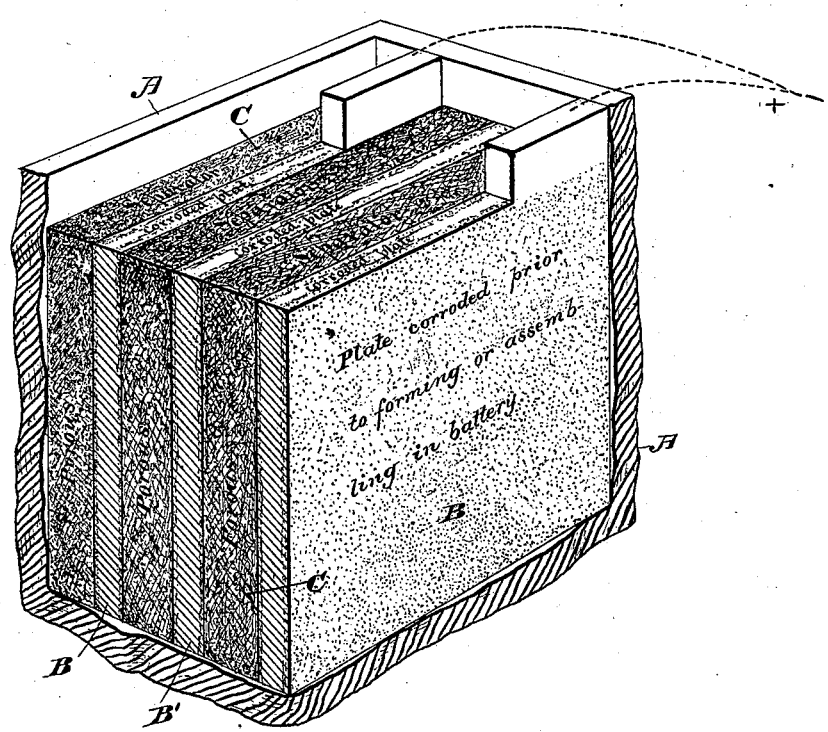
Attest:
Geo. T. Smallwood.
J. Henry Kaiser.
Inventor.
William Anthony Shaw
by A. Pollok
his attorney

UNITED STATES PATENT OFFICE.

WILLIAM ANTHONY SHAW, OF PITTSBURG, PENNSYLVANIA, ASSIGNOR TO THE ELECTRICAL ACCUMULATOR COMPANY, OF NEW YORK, N. Y.

SECONDARY BATTERY.

SPECIFICATION forming part of Letters Patent No. 297,457, dated April 22, 1884.

Application filed July 21, 1883. (No model.)

*To all whom it may concern:*

Be it known that I, WILLIAM ANTHONY SHAW, of Pittsburg, in the county of Allegheny and State of Pennsylvania, (formerly of Brooklyn, Kings county, New York,) have invented a new and useful Improvement in Secondary Batteries, which improvement is fully set forth in following specification.

This invention has reference more particularly to that class of secondary voltaic, galvanic, or electric batteries in which the active material of one or both elements of the couples is insoluble in the exciting-liquid or electrolyte, so that it remains always a part of the plate or element, and is not alternately dissolved in the discharge and precipitated in the charge, as in some secondary batteries.

The invention consists in corroding the plates or body of the elements by chemical agents—such, for example, as nitric, nitro-sulphuric, acetic, hydrochloric, or other acid, or a saturated solution of nitrate of soda or potash—the corrosion being aided, if desired, by electricity preparatory to placing such an element in the exciting-liquid or electrolyte of the secondary cells.

Heretofore in the well-known Planté battery, the surfaces of battery plates or elements of the cell have been disintegrated, by repeated charging in opposite directions until a considerable body of material adapted to be acted upon chemically by the exciting-liquid or electrolyte has been obtained. This mode of "forming" the plates, as it is called, is slow in its action and expensive. By corroding the plates preparatory to assembling them in a cell, the corroding agent may be much stronger than would be practical in the exciting-liquid or electrolyte of the cell, and the corrosion may be made to take place very rapidly. The use of electric currents is not essential, since the corroding agent will act without it.

In order to carry the invention into effect, a plain, corrugated, or perforated plate of lead, or a leaden element of other suitable shape, is placed in nitric acid, (say a mixture of one part commercial acid and one part water,) and allowed to remain therein until corroded to a sufficient depth—say for a week, more or less. It is then removed and washed in clean water carefully, so as to remove the free acid, but not the corroded metal, and placed with an opposing element of the same or of other suitable construction in an exciting-liquid, such as dilute sulphuric acid—say a ten per cent. solution in water. The nitric acid need not be of the strength described, this being given only by way of example. Neither is the invention limited to any particular time of immersion.

Instead of nitric acid, a saturated solution of nitrate of soda or potash, with addition of nitric or sulphuric acid, may be used with good effect. The use of acetic, hydrochloric, and nitro-sulphuric acids has already been mentioned.

It is obvious that as there are various other chemical agents adapted to corrode lead, any of them may be used; and that in case other metals than lead be used in the elements, an appropriate corroding agent is to be employed. Various solutions may be used as the exciting-liquid or electrolyte, although the dilute sulphuric acid will ordinarily be preferred.

In the accompanying drawing, a section of a secondary galvanic cell is shown in perspective, A being the containing-vessel of non-conducting material; B, plates of one name or polarity; B', a plate of opposite polarity, and C the porous filling or separating medium between the plates or elements.

This application is a division of my application for improvement in secondary batteries, filed April 14, 1882, and officially numbered 58,313.

I may observe that the ears or tags to the electrodes, as shown, were not a part of my invention as originally described, and that they are simply shown as a convenient means of making connection with the exterior circuit. Any other known or suitable means may be used instead.

I claim—

The method of making plates or elements for secondary batteries by corroding with nitric, acetic, or hydrochloric acid or other chemical corroding agent, a plain, corrugated, or perforated lead plate, or other suitable body of lead, or a suitable body of other metal, and then removing them from the action of the corroding agent and assembling the same with other elements in the cell, with an exciting solution or electrolyte, substantially as described.

In testimony whereof I have signed this specification in the presence of two subscribing witnesses.

WM. ANTHONY SHAW.

Witnesses:
    A. POLLOK,
    PHILIP MAURO.